United States Patent
Izumino et al.

(10) Patent No.: US 7,121,950 B2
(45) Date of Patent: Oct. 17, 2006

(54) TRIPOD TYPE CONSTANT VELOCITY UNIVERSAL JOINT

(75) Inventors: Junichi Izumino, Shizouka-ken (JP); Minoru Ishijima, Shizuoka-ken (JP); Kenta Yamazaki, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/980,839

(22) Filed: Nov. 4, 2004

(65) Prior Publication Data
US 2005/0107168 A1    May 19, 2005

(30) Foreign Application Priority Data
Nov. 14, 2003    (JP)    ............ 2003-385588

(51) Int. Cl.
*F16D 3/26*    (2006.01)
(52) U.S. Cl. .............. 464/111; 464/123; 464/124; 464/905
(58) Field of Classification Search ............ 464/111, 464/123, 124, 905
See application file for complete search history.

(56) References Cited

U.S. PATENT DOCUMENTS

| | | | |
|---|---|---|---|
| 5,391,013 A | 2/1995 | Ricks et al. | |
| 6,033,311 A | 3/2000 | Bartlett | |
| 6,776,719 B1 * | 8/2004 | Perrow | 464/111 |
| 6,776,720 B1 * | 8/2004 | Bartlett | 464/111 |
| 2003/0232655 A1 | 12/2003 | Perrow | |

FOREIGN PATENT DOCUMENTS

JP    09-324822 A    12/1997

* cited by examiner

*Primary Examiner*—Aaron Dunwoody
(74) *Attorney, Agent, or Firm*—Arent Fox PLLC

(57) ABSTRACT

A tripod type constant velocity universal joint that can suppress generation of shudder by reducing the 3rd order cyclic axial force and has high rotation durability. In a double-roller tripod type constant velocity universal joint, a track gap $\delta 1$ between one of the roller guiding surfaces formed on both sides of a track groove, which is on the no-load applied side, and an outer circumferential surface of an outer roller is set to satisfy $\delta 1 > 0.03/A$. Also, a shoulder gap $\delta 2$ between a guide shoulder surface formed at the bottom of the track groove and a side surface of the outer roller is set to satisfy $\delta 2 > 0.15 \times A$. In both the expressions, a degree of torus A is defined as a ratio of a radius of curvature r of a generatrix of the outer circumferential surface to a radius R of an outer circumference of the outer roller ($A = r/R$).

15 Claims, 5 Drawing Sheets

TRIPOD TYPE CONSTANT VELOCITY UNIVERSAL JOINT

BACKGROUND OF THE INVENTION

1. Field of the Invention

The present invention relates to a tripod type constant velocity universal joint used for transmitting a torque between rotation shafts that are incorporated into a drive system of an automobile and are mainly located on a nonlinear line, for example.

2. Description of the Related Art

In a drive shaft of an automobile, or the like, a constant velocity universal joint of a tripod type is frequently used as a constant velocity universal joint on an inboard side of the automobile. As shown in FIGS. 7 and 8, this tripod type constant velocity universal joint 31 includes an outer joint member 34, an inner joint member 37, and rollers 38. The outer joint member 34 is secured to an end of a first rotation shaft 32 such as a drive shaft, has a bottomed cylindrical shape, and includes track grooves 33 extending axially and distributed at circumferentially trisectional positions on its inner circumferential surface. The inner joint member 37 is secured to an end of a second rotation shaft 35 such as a driven shaft, and includes trunnion journals 36 extending radially and distributed at circumferentially trisectional positions on its outer circumferential surface. Each of the rollers 38 is supported by the associated trunnion journal 36 in such a manner that the roller 38 can rotate freely and be slightly displaced in the axial direction of the associated trunnion journal 36. Each roller 38 is received within the associated track groove 33 of the outer joint member 34 and can roll on roller guiding surfaces 33a of the track groove 33. The roller guiding surfaces 33a are formed on both circumferential sides of the track groove 33.

In the case where the central axis of the first rotation shaft 32 is not coincident with that of the second rotation shaft 35, i.e., the tripod type constant velocity universal joint 31 forms an operating angle, each trunnion journal 36 is displaced with respect to the roller guiding surface 33a of the corresponding track groove 33 in a direction in which that trunnion journal 36 swings around the inner joint member 37 along with the rotation of the first and second rotation shafts 32 and 35, as shown in FIGS. 7 and 8. In this displacement, the roller 38 supported by each trunnion journal 36 rolls on the roller guiding surface 33a of the corresponding track groove 33.

In this case, each roller 38 moves along the roller guiding surface 33a while changing its tilt with respect to the axial direction of the outer joint member 34, and is displaced in the axial direction of the corresponding trunnion journal 36. When each roller 38 makes such a complicated movement, the outer circumferential surface of each roller 38 is not smoothly moved with respect to the corresponding roller guiding surface 33a, thus causing large friction between those surfaces. This causes generation of the 3rd order cyclic axial force in the tripod type constant velocity universal joint 31. This axial force may cause vibration called as shudder, for example, in the case where a large torque is transmitted while the tripod type constant velocity universal joint 31 is incorporated into an automobile or the like and forms a large operating angle.

Means for solving the above problem is disclosed in U.S. Patent Application Publication No. US2002/0115491 A1 and Japanese Patent Laid-Open Publication No. Hei 5-215141, for example. Those publications describe a so-called double-roller tripod type constant velocity universal joint in which an outer roller, which can make a relative rotation with respect to an inner roller via a needle roller, rolls along an track groove of an outer joint member, as shown in FIGS. 9 and 10.

In the tripod constant velocity universal joint 41 disclosed in US2002/0115491 A1, an outer circumferential surface of a head of a trunnion journal 42 is formed to be spherical and an inner circumferential surface of the inner roller 43 is also formed to be spherical, so that both of those surfaces can spherically fit with each other (see FIG. 9). Thus, it is possible to ensure a sufficient contact area between the trunnion journal 42 and the inner roller 43 and reduce the pressure on the contact area. This leads to increase of rotation durability.

On the other hand, the tripod type constant velocity universal joint 51 disclosed in Japanese Patent Laid-Open Publication No. Hei 5-215141, PCD of the trunnion journal and that of the track groove of the outer joint member are set to have a plus offset (i.e., journal PCD>track-groove PCD) or a minus offset (i.e., journal PCD<track-groove PCD), thereby reducing and stabilizing an induction force at every operating angle. The roller guiding surface 56a is formed to have a Gothic arch shape and is in angular contact with an outer circumferential surface of the outer roller 54 at two points (see FIG. 10). This angular contact allows generation of a couple of restoring forces acting in a direction for preventing tilt of the outer roller 54 on a plane containing the central axis of the outer joint member 56 to place the outer roller 54 in parallel to that plane. Thus, it is possible to keep the outer roller 54 parallel to the track groove of the outer joint member 56.

However, when the aforementioned double-roller tripod type constant velocity universal joint is rotated with a certain operating angle, each trunnion journal swings on the track groove and is also displaced in the radial direction of the outer joint member. Thus, a tilting moment is generated so as to cause the outer roller to tilt in a cross section perpendicular to the central axis of the outer joint member. Simultaneously, a spinning moment is also generated by a frictional force between the inner circumferential surface of the inner roller and the outer circumferential surface of the trunnion journal caused by the swinging of the trunnion journal so as to cause the outer roller to be tilted in a cross section containing the central axis of the outer joint member. As those moments causing the tilt of the outer roller become larger, the outer roller largely tilts. Consequently, the roller guiding surface of the track groove, which is on the no-load applied side, comes into contact with the outer circumferential surface of the outer roller, or a guide shoulder surface formed at the bottom of the track groove comes into contact with the side surface of the outer roller. Moreover, when the outer roller tries to tilt further, the contact surface pressure on the area between the outer roller and the roller guiding surface of the track groove on the no-load applied side or the guide shoulder surface at the bottom of the track groove further increases.

In this case, the frictional force within the tripod type constant velocity universal joint is increased, thus increasing the 3rd order cyclic axial force. This may cause generation of shudder or degradation of rotation durability.

SUMMARY OF THE INVENTION

It is an object of the present invention to provide a tripod type constant velocity universal joint that can reduce the 3rd order cyclic axial force so as to suppress generation of shudder and that has high rotation durability.

In order to achieve the above object, according to a first aspect of the present invention, a tripod type constant velocity universal joint comprises: an outer joint member having track grooves extending axially and distributed at circumferentially trisectional positions on an inner circumferential surface of the outer joint member; an inner joint member having trunnion journals projecting radially and distributed at circumferentially trisectional positions on an outer circumferential surface oh the inner joint member; and roller mechanisms attached to the trunnion journals, respectively, each of the roller mechanism having a roller capable of being shaken with respect to a corresponding one of the trunnion journals and axially rolling on a corresponding one of the track grooves, each of the track grooves having roller guiding surfaces for guiding an outer circumferential surface of the roller of the corresponding roller mechanism on both circumferential sides, wherein a track gap $\delta 1$ (mm), formed between the outer circumferential surface of the roller and one roller guiding surface while a torque is applied, is set to satisfy $\delta 1 > 0.03/A$. In the above expression, $A=r/R$, and r represents a radius of curvature of a generatrix of the outer circumferential of the roller and R represents a radius of an outer circumference of the roller.

According to a second aspect of the present invention, a tripod type constant velocity universal joint comprises: an outer joint member having track grooves extending axially and distributed at circumferentially trisectional positions on an inner circumferential surface of the outer joint member; an inner joint member having trunnion journals projecting radially and distributed at circumferentially trisectional positions on an outer circumferential surface oh the inner joint member; and roller mechanisms attached to the trunnion journals, respectively, each of the roller mechanism having a roller capable of being shaken with respect to a corresponding one of the trunnion journals and rolling axially on a corresponding one of the track grooves, each of the track grooves having a guide shoulder surface opposed to a side surface of the corresponding roller, wherein a shoulder gap $\delta 2$ (mm) between the guide shoulder surface and the side surface of the corresponding roller is set to satisfy $\delta 2 > 0.15 \times A$ when $A=r/R$ where r represents a radius of curvature of a generatrix of an outer circumferential surface of the roller and R represents a radius of an outer circumference of the roller.

According to a third aspect of the present invention, a tripod type constant velocity universal joint comprises: an outer joint member having track grooves extending axially and distributed at circumferentially trisectional portions on an inner circumferential surface of the outer joint member; an inner joint member having trunnion journals projecting radially and distributed at circumferentially trisectional positions on an outer circumferential surface oh the inner joint member; and roller mechanisms attached to the trunnion journals, respectively, each of the roller mechanisms having a roller capable of being shaken with respect to a corresponding one of the trunnion journals and rolling on a corresponding one of the track grooves axially, each of the track grooves having roller guiding surfaces for guiding an outer circumferential surface of the roller of the corresponding roller mechanisms on both circumferential sides and a guide shoulder surface opposed to a side surface of the corresponding roller, wherein a track gap $\delta 1$ (mm), formed between the roller guiding surface and the outer circumferential surface of the corresponding roller while a torque is applied, is set to satisfy $\delta 1 > 0.03/A$, and a shoulder gap $\delta 2$ (mm) between the guide shoulder surface and the side surface of the corresponding roller is set to satisfy $\delta 2 > 0.15 \times A$. In the above expressions, $A=r/R$ and r represents a radius of curvature of a generatrix of an outer circumferential surface of the roller and R represents a radius of an outer circumference of the roller.

The aforementioned tripod type constant velocity universal joints were made by focusing on a relationship between a degree of torus $A$ ($=r/R$) represented by a ratio of a generatrix radius of curvature r of the outer circumferential surface of the roller to the radius R of the outer circumference of the roller, and the roller that can tilt in various directions within the track groove. Thus, in those tripod type constant velocity universal joints, the track gap $\delta 1$ between the outer circumferential surface of the roller and the roller guiding surface on the no-load applied side or the shoulder gap $\delta 2$ between the side surface of the roller and the guide shoulder surface is determined. In other words, as the degree of torus A becomes smaller, the roller tends to tilt more easily in a cross section perpendicular to the central axis of the outer joint member. Therefore, the outer circumferential surface of the roller comes into contact with the roller guiding surface on the no-load applied side more easily. On the contrary, in a cross section containing the central axis of the outer joint member, it is harder for the roller to tilt. It is also harder for the side surface of the roller to come into contact with the guide shoulder surface of the track groove. On the other hand, as the degree of torus A becomes larger, it is harder for the roller to tilt in a cross section perpendicular to the central axis of the outer joint member and it is also harder for the roller to come into contact with the roller guiding surface on the no-load applied side. On the contrary, the roller tends to tilt easily in a cross section containing the central axis of the outer joint member and it is easy for the roller to come into contact with the guide shoulder surface of the track groove.

Based on the above examination result, according to the present invention, especially in order to avoid the contact between the outer circumferential surface of the roller and the roller guiding surface on the no-load applied side of the track groove, a track gap $\delta 1$ between the outer circumferential surface of the roller and that roller guiding surface is set to satisfy $\delta 1 > 0.03/A$ so that the track gap $\delta 1$ is in inverse proportion to the degree of torus A. Thus, it is possible to suppress the contact force between the outer circumferential surface of the roller and the roller guiding surface on the no-load applied side of the track groove to be minimum even in the case where the degree of torus of the roller is varied. Therefore, the 3rd order cyclic axial force can be reduced, thus suppressing generation of shudder and ensuring high rotation durability of the joint.

Moreover, according to the present invention, especially in order to avoid the contact between the roller side surface and the guide shoulder surface, a shoulder gap $\delta 2$ between the roller side surface and the guide shoulder surface is set to satisfy $\delta 2 > 0.15 \times A$, so that the shoulder gap $\delta 2$ is in proportion to the degree of torus A. Thus, it is possible to reduce the contact force between the side surface and the guide shoulder surface even in the case where the degree of torus A is varied. Therefore, as with the aforementioned case, the 3rd order cyclic axial force can be reduced, thus suppressing generation of shudder and ensuring high rotation durability of the joint.

The present invention is not limited to a case where either the track gap $\delta 1$ or the shoulder gap $\delta 2$ is set to satisfy the aforementioned range. Both the gaps $\delta 1$ and $\delta 2$ may be set to satisfy the aforementioned ranges, respectively.

It is preferable that a value of the degree of torus A, which is defined as $A=r/R$ (where r represents a radius of curvature of a generatrix of the outer circumferential surface of the roller and R represents a radius of the outer circumference of the roller), be set to satisfy $0.475 \leq A < 1$.

The shape of the roller guiding surface is not limited to a specific shape. The radius of curvature of the generatrix of the roller guiding surface and a radius of curvature of the outer circumferential surface of the roller may be set to be approximately the same so that the outer circumferential surface of the roller and the roller guiding surface come into close contact with each other. Besides this contact, the roller guiding surface may have a Gothic arch shape so as to come into angular contact with the outer circumferential surface of the roller.

Moreover, it is sufficient that the roller mechanism includes a roller that is rotatable while being supported by a trunnion journal to freely swing. For example, the roller mechanism can further include a ring arranged inside the roller in the circumferential direction and a rolling element interposed between the roller and the ring, in addition to the roller.

As described above, according to the tripod type constant velocity universal joint of the present invention, generation of shudder when a torque is transmitted can be suppressed by reducing the 3rd order cyclic axial force. High rotation durability can also be obtained.

DETAILED DESCRIPTION OF THE PREFERRED EMBODIMENTS

Embodiments of the present invention will now be described with reference to the accompanying drawings.

Figure 1:
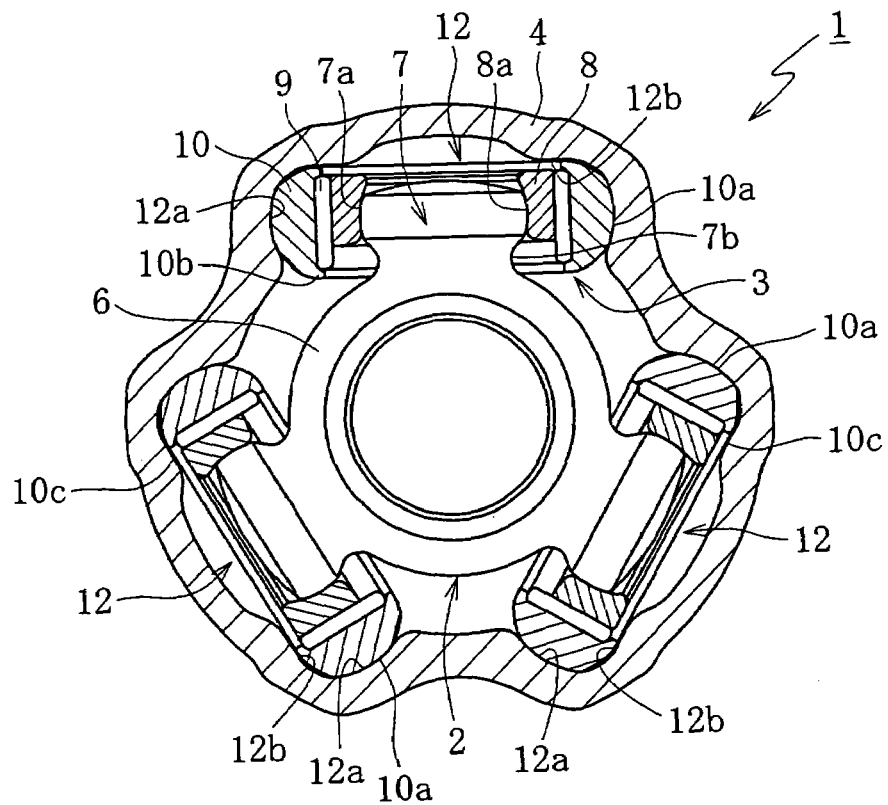
FIG. 1 is a transverse cross-sectional view of a tripod type constant velocity universal joint according to an embodiment of the present invention, viewed from a direction along a main axis.
Figure 2:
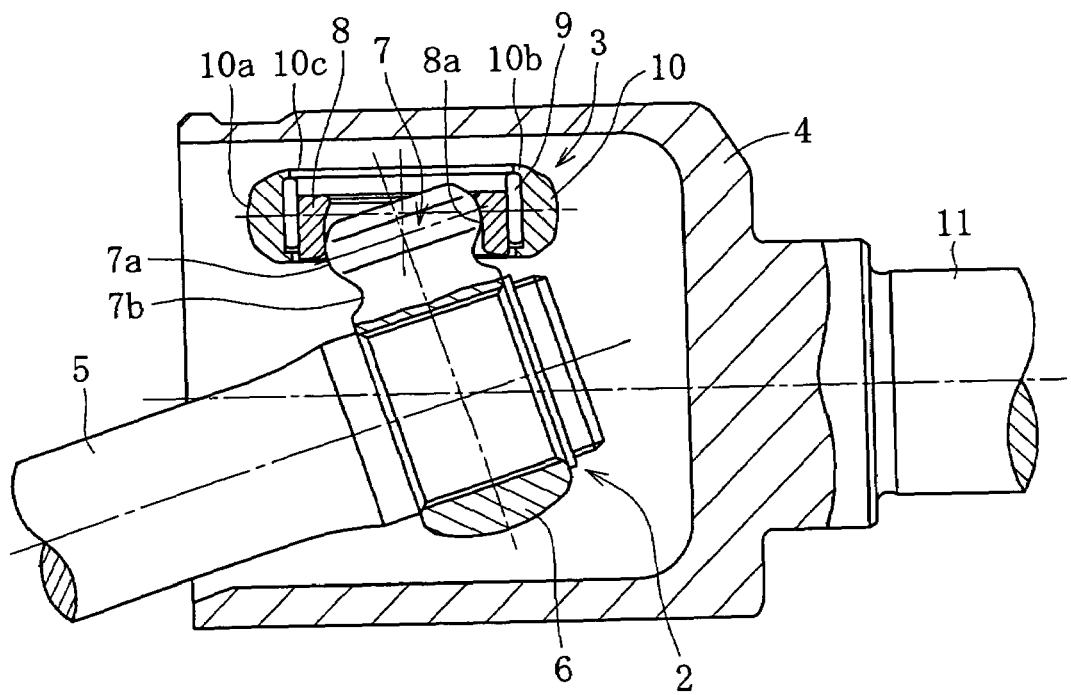
FIG. 2 is a vertical cross-sectional view of the tripod type constant velocity universal joint, viewed from a horizontal direction of the main axis.

FIGS. 1 and 2 are cross-sectional views of a tripod type constant velocity universal joint according to one embodiment of the present invention. FIG. 1 shows a cross section perpendicular to a main shaft of the tripod type constant velocity universal joint, while FIG. 2 shows a cross section containing the main axis. The tripod type constant velocity universal joint 1 mainly includes an inner joint member 2, a roller mechanism 3, and an outer joint member 4.

The inner joint member 2 includes a boss 6 secured to a second rotation shaft 5 such as a driven shaft, and trunnion journals 7 projecting radially and distributed at circumferentially trisectional positions on a boss 6. On the outer circumferential surface of the head of the trunnion journal 7, an approximately convex spherical surface 7a is formed to become convex in a radial direction. Moreover, on the outer circumferential surface of the trunnion journal 7 at a position closer to the boss 6 than the approximately spherical surface 7a is provided an annular dent 7b used for attaching the roller mechanism 3 to the trunnion journal 7 while the roller mechanism 3 is tilted.

The roller mechanism 3 is formed by an inner roller 8 as a ring, a needle roller 9 as a rolling element, and an outer roller 10 as a roller that can relatively rotate with respect to the inner roller 8 via the needle roller 9 and is slidable axially.

The inner roller 8 has an approximately annular shape and includes an approximately concave spherical surface 8a on its inner circumference. The approximately spherical surface 8a becomes concave in the radial direction. The approximately concave spherical surface 8a has approximately the same generatrix radius of curvature as that of the approximately convex spherical surface 7a, so as to allow spherical fitting of the approximately spherical surface 8a formed on the inner circumference of the inner roller 8 and the approximately spherical surface 7a formed on the outer circumference of the trunnion journal 7 when the roller mechanism 3 is attached to the trunnion journal 7. When the roller mechanism 3 is attached to the trunnion journal 7, the inner roller 8 is supported by the trunnion journal 7 to be freely swingable while its approximately spherical surface 8a spherically fits with the approximately spherical surface of the trunnion journal 7.

The outer roller 10 has an approximately annular shape and its outer surface 10a forms an annular surface that becomes convex in the radial direction. Between the outer cylindrical surface of the inner roller 8 and the inner cylindrical surface of the outer roller 10, a plurality of needle rollers 9 as rolling elements are interposed. More specifically, at both edges of the inner surface of the cylindrical outer roller 10, needle-roller retainers 10b and 10b are provided to extend over the circumference of the outer roller 10. Between these needle-roller retainers 10b and 10b, the plurality of needle rollers 9 are received to be slightly movable in the axial direction and be freely rotatable. Those needle rollers 9 allow relative rotation and relative movement in the axial direction, of the inner roller 8 and the outer roller 10 with respect to each other. Although a structure in which the needle-roller retainers 10b are formed integrally with the outer roller 10 is described as an example in this embodiment, the structure of the needle-roller retainer is not limited thereto. For example, a retaining ring and a washer that are separate components from the outer roller 10 may be used as the needle-roller retainer.

The outer joint member 4 has an approximately cylindrical shape having a bottom. One end of the outer joint member 4 is opened and the other end thereof, at which the bottom is formed, is secured to the first rotation shaft 11 such as a drive shaft. On the inner circumference of the outer joint member 4, track grooves 12 are distributed at circumferentially trisectional positions, as shown in FIG. 1. Each track groove 12 is formed to extend from the opening side in a direction of the central axis of the outer joint member 4.

The track groove 12 is arranged to receive the outer roller 10 in such a manner that the outer roller 10 can freely roll in the direction of the central axis of the outer joint member 4. On both circumferential sides of the track groove 12, a pair of roller guiding surfaces 12*a* are formed to be opposed to each other. Each roller guiding surface 12*a* has a circular-arc cross section that is concave. The roller guiding surface 12*a* has approximately the same generatrix radius of curvature as that of the outer circumferential surface 10*a* of the outer roller 10. On the bottom of the track groove 12, i.e., on the surface opposed to the side surface 10*c* of the outer roller 10 received in that track groove 12, a guide shoulder surface 12*b* is formed to be flat. The guide shoulder surface 12*b* has a function of limiting the tilt of the outer roller 10 on a cross section perpendicular to the central axis of the outer joint member 4 and the tilt on a cross section containing the central axis of the outer joint member 4.

In the tripod type constant velocity universal joint 1 having the aforementioned structure, when the first rotation shaft 11 rotates, for example, rotating torque is transmitted from the outer joint member 4 to the boss 6 of the inner joint member 2 via the roller mechanisms 3 and the trunnion journals 7 so as to rotate the second rotation shaft 5. In the case where the central axis of the first rotation shaft 11 is not coincident with that of the second rotation shaft 5, i.e., the central axes of the first and second rotation shafts 11 and 5 form a operating angle, the rotation of the first and second rotation shafts 11 and 5 causes displacement of each trunnion journal 7 with respect to the roller guiding surfaces 12*a* of the corresponding track grooves 12 in a direction in which the trunnion journal 7 swings around the inner joint member 2. At the same time, the outer roller 10 of the roller mechanism 3 supported by each trunnion journal 7 rolls axially on the roller guiding surface 12*a* of the track groove 12 and is relatively displaced in the axial direction of the trunnion journal 7. In this manner, even in the case where the tripod type constant velocity universal joint 1 forms a operating angle, torque transmission can be achieved between the first rotation shaft 11 and the second rotation shaft 5.

Figure 3:
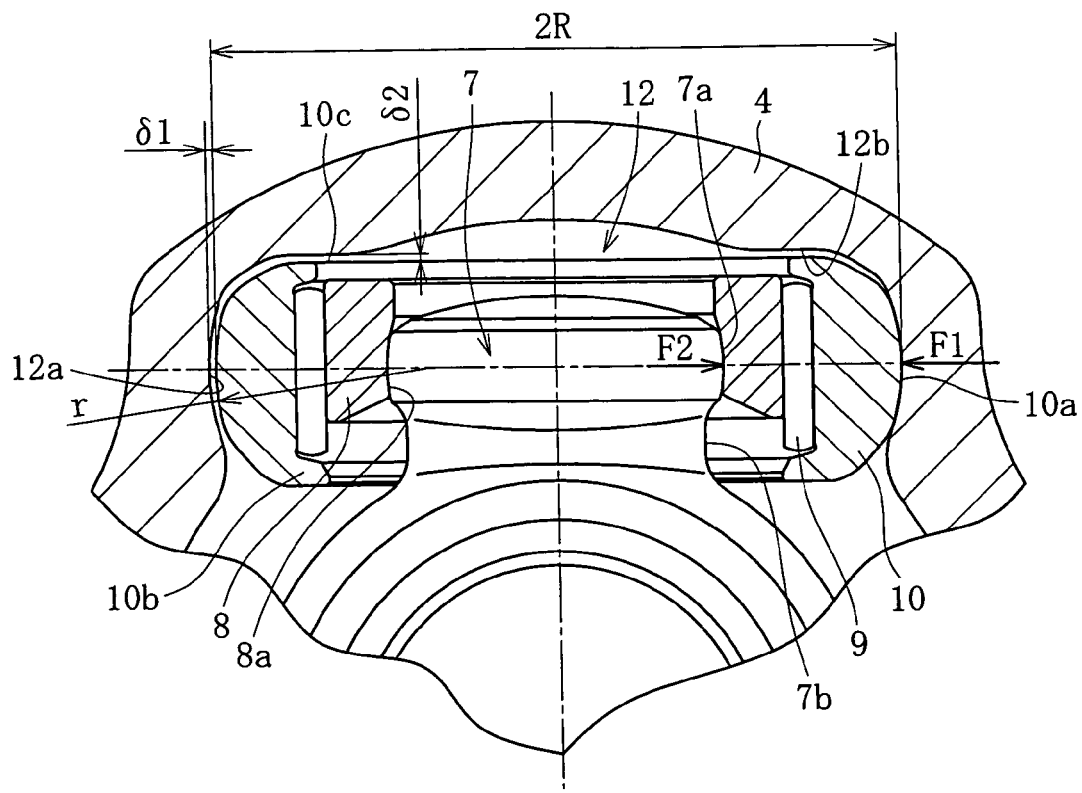
FIG. 3 is a transverse cross-sectional view of the tripod type constant velocity universal joint in the case where a torque is transmitted while a operating angle is zero.

FIG. 3 is a transverse cross-sectional view showing the tripod type constant velocity universal joint 1 in the case where a torque is transmitted from the first rotation shaft 11 to the second rotation shaft 5 when the operating angle is zero. In this case, line of action of a force F1 that acts from the side of the outer joint member 4 (i.e., the roller guiding surface 12*a* of the track groove 12) toward the outer roller 10 is coincident with that of a reactive force F2 (=−F1) acting from the side of the trunnion journal 7 toward the inner roller 8. It is now assumed that a ratio of a generatrix radius of curvature r of the outer circumferential surface 10*a* of the outer roller 10 to a radius R of the outer circumference of the outer roller 10 (in other words, a radius of a sphere to circumscribe the outer roller 10) is represented by a degree of torus A (=r/R) and a range of a value for A satisfies A<1. In addition, in the state shown in FIG. 3, a gap between the roller guiding surface 12*a* on the side to which no load is applied (the left side in the shown example) and the outer circumferential surface 10*a* of the outer roller 10 is defined as a track gap δ1, and a gap between the guide shoulder surface 12*b* formed at the bottom of the track groove 12 and the side face 10*c* of the outer roller 10 is defined as a shoulder gap δ2. Then, the track gap δ1 (mm) and the shoulder gap δ2 (mm) are determined to satisfy the following expressions, respectively.

$$\delta 1 > 0.03/A$$

$$\delta 2 > 0.15 \times A$$

Figure 4:
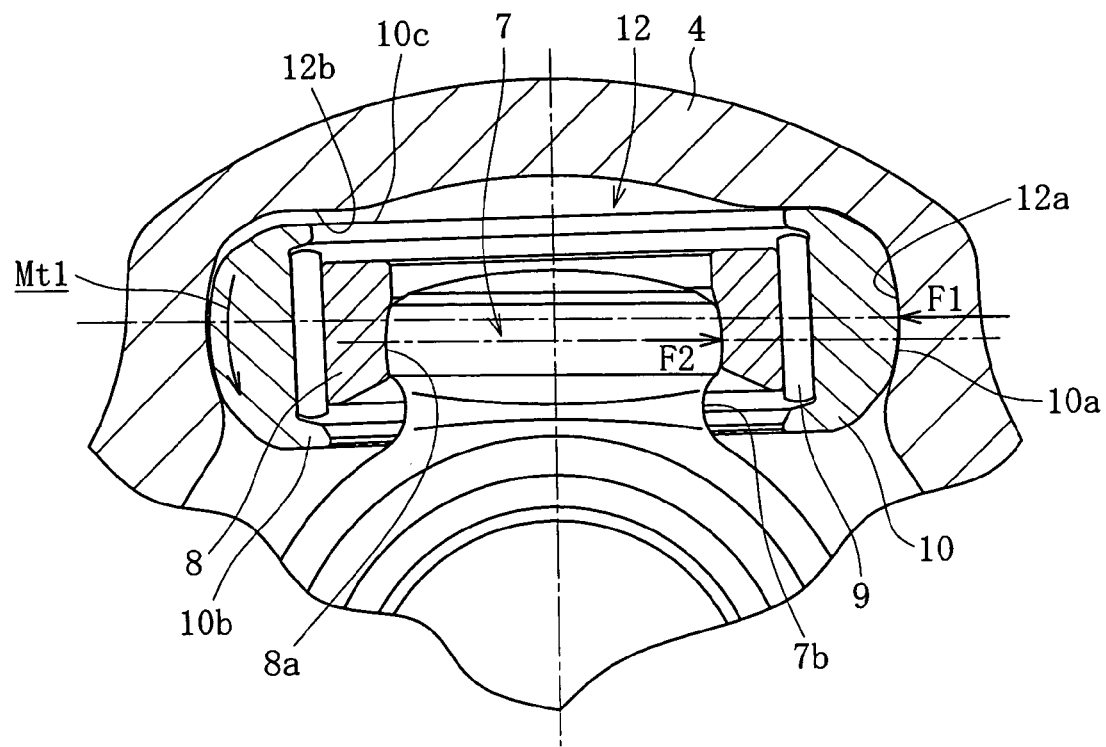
FIG. 4 is a transverse cross-sectional view of the tripod type constant velocity universal joint in the case where a rotational torque is transmitted while a certain operating angle is formed.

FIG. 4 is a transverse cross-sectional view of the tripod type constant velocity universal joint 1 in the case where rotation torque is transmitted when a certain operating angle is formed. In this case, the trunnion journal 7 swings around the center of the axis of the inner joint member 2. Thus, line of action of the reactive force F2 (that is the same as the force F1 in its magnitude but is different in its direction) applied from the side of the trunnion journal 7 toward the inner roller 8 is deviated from line of action of the force F1 applied from the side of the outer joint member 4 (the roller guiding surface 12*a* of the track groove 12) toward the outer roller 10, in the axial direction of the trunnion journal 7 (in the radial direction of the second rotation shaft 5) so that an offset in the axial direction is formed between both lines of action. This offset causes generation of a tilting moment Mt1 that tilts the outer roller 10 on a cross section perpendicular to the central axis of the outer joint member 4. If the track gap δ1 falls within a range of δ1≦0.03/A, the roller guiding surface 12*a* on the side to which no load is applied easily comes into contact with the outer circumferential surface 10*a* of the outer roller 10 as shown in the same figure, thus increasing the contact force. On the contrary, according to the present invention, the track gap δ1 is set to satisfy δ1>0.03/A. Therefore, the aforementioned disadvantage can be solved.

Figure 5:
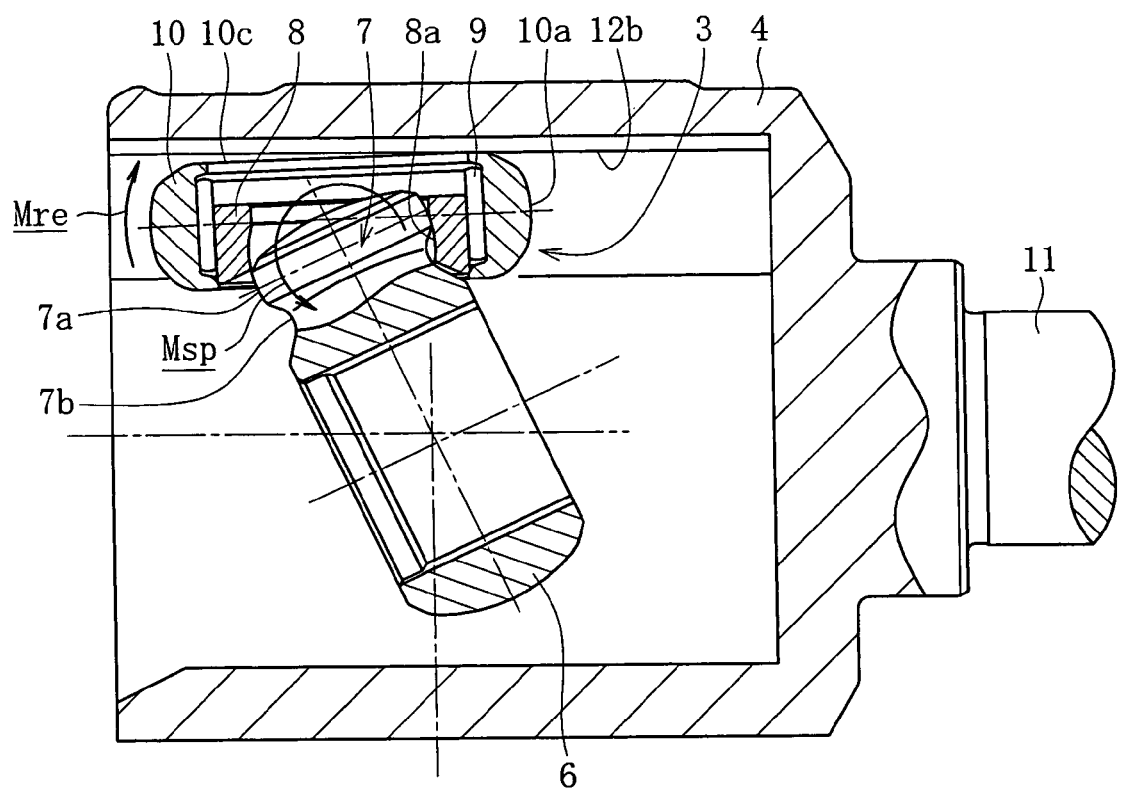
FIG. 5 is a vertical cross-sectional view of the tripod type constant velocity universal joint in the case where a rotational torque is transmitted while a certain operating angle is formed.
Figure 6:
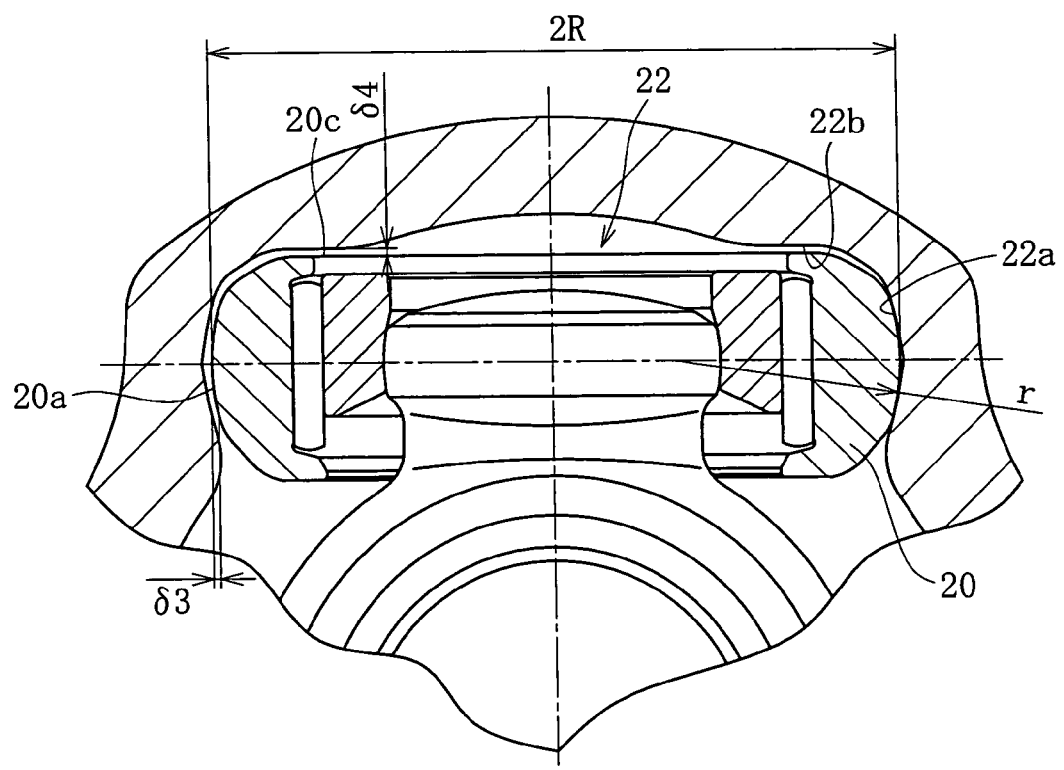
FIG. 6 is a transverse cross-sectional view of another exemplary tripod constant velocity universal joint having a roller guiding surface of a Gothic arch shape.
Figure 7:
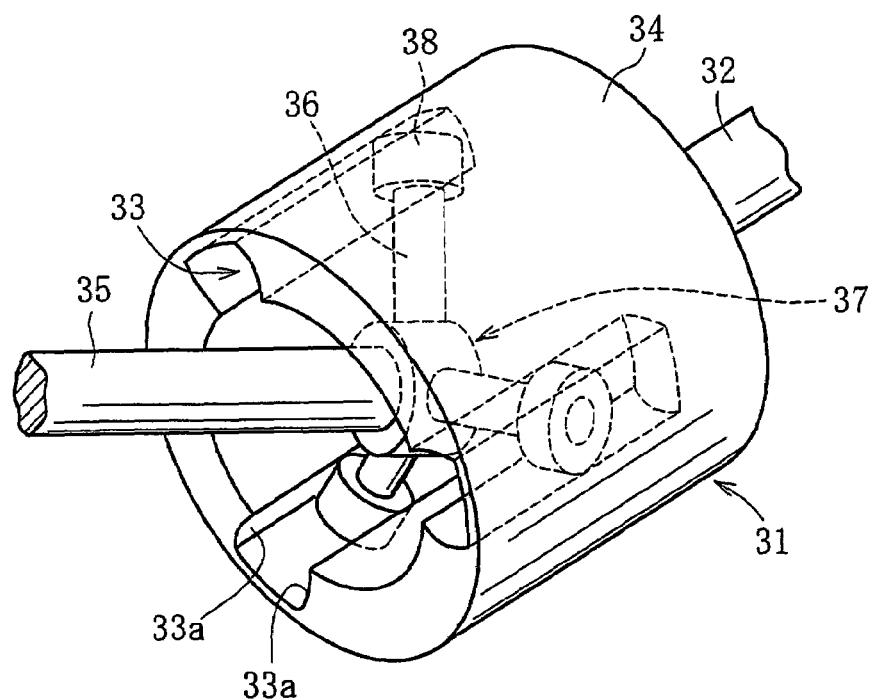
FIG. 7 is a schematic perspective view showing a conventional tripod constant velocity universal joint.
Figure 8:
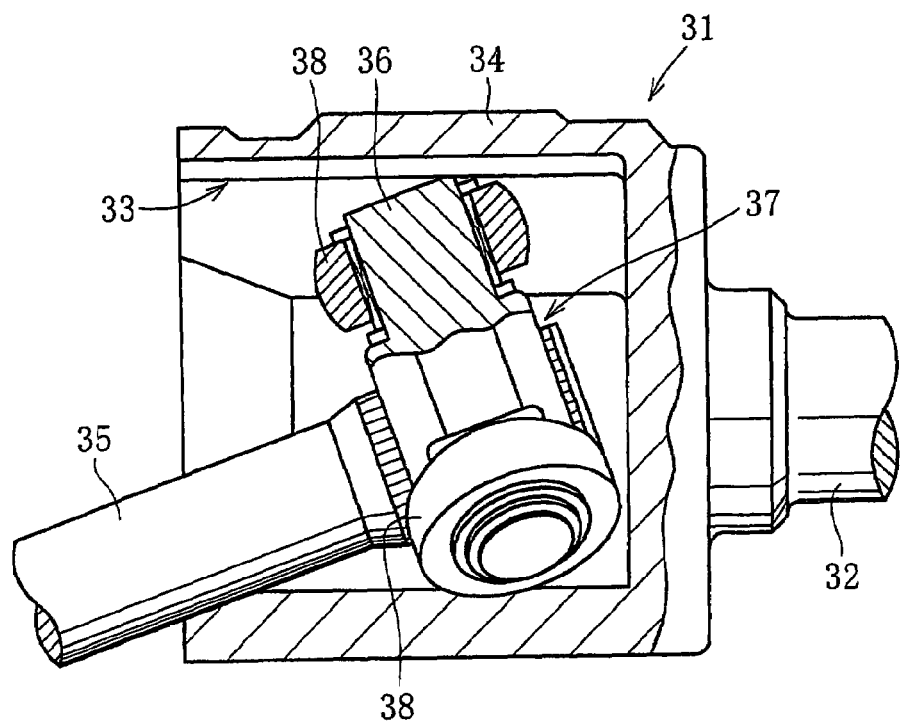
FIG. 8 is a vertical cross-sectional view of a part of a conventional tripod type constant velocity universal joint.
Figure 9:
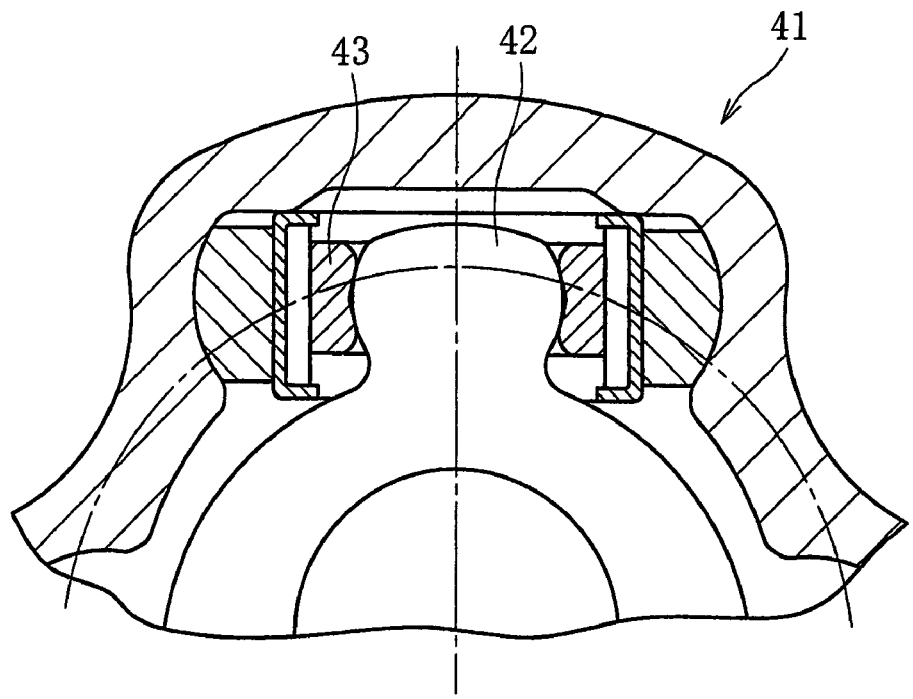
FIG. 9 is a transverse cross-sectional view of an exemplary double-roller tripod type constant velocity universal joint.
Figure 10:
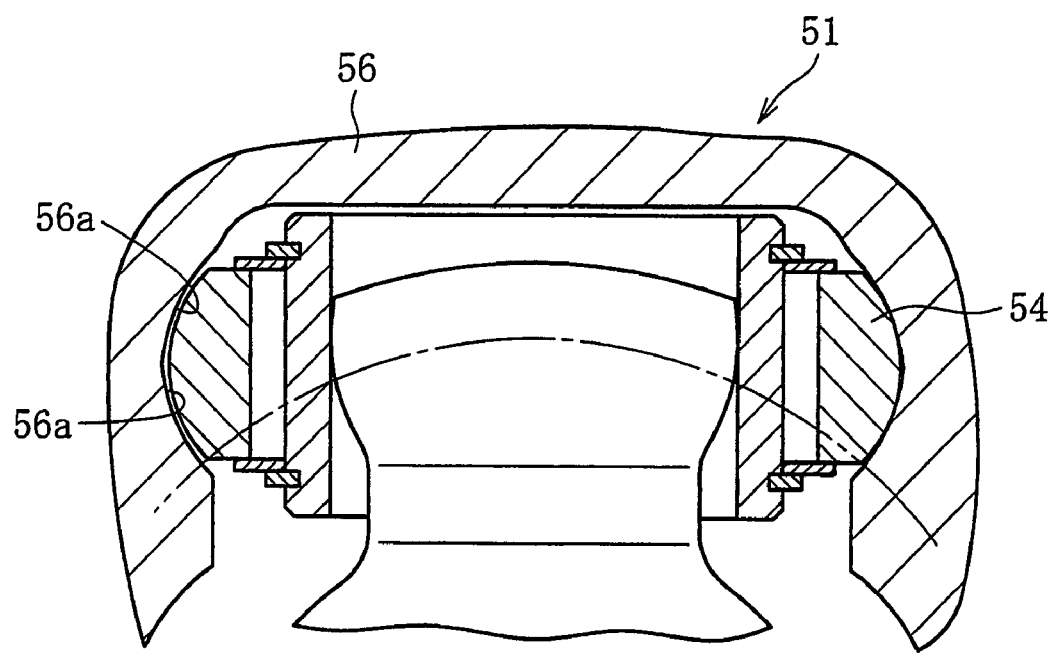
FIG. 10 is a vertical cross-sectional view of another exemplary double-roller tripod type constant velocity universal joint.

FIG. 5 is a vertical cross-sectional view of the tripod type constant velocity universal joint 1 in the case where rotation torque is transmitted from the first rotation shaft 11 to the second rotation shaft 5 while a certain operating angle is formed, as in the case shown in FIG. 4. In this case, the approximately spherical surface 7*a* (outer circumferential surface) of the trunnion journal 7 comes into contact with the approximately spherical surface 8*a* (inner circumferential surface) of the inner roller 8, so that a spinning moment Msp for causing rotation of the outer roller 10 on a plane containing the central axis of the outer joint member 4 is generated by the frictional force generated between the respective contact surfaces. Simultaneously, a couple of restoring forces Mre for bringing back the outer roller 10 to be parallel to the central axis of the outer joint member 4 is generated, because the degree of torus A is less than one (i.e., the radius of curvature r of the generatrix of the outer circumferential surface 10*a* of the outer roller 10 is smaller than the radius R of the outer circumference of the outer roller 10) and the generatrix radius of curvature r of the outer circumferential surface 10*a* is approximately the same as the radius of curvature of the roller guiding surface 12*a*. Alternatively, in the case where the outer circumferential surface 10*a* of the outer roller 10 comes into angular contact with the roller guiding surface 12*a*, as shown in FIG. 6, the aforementioned couple of restoring forces Mre is generated by the angular contact. At this time, if the shoulder gap δ2 falls within a range of δ2≦0.15×A, the side face 10*c* of the outer roller 10 and the guide shoulder surface 12*b* provided at the bottom of the track groove 12 easily come into contact with each other, as shown in the same figure, thus increasing the contact force. On the contrary, according to the present invention, the shoulder gap δ2 is set to satisfy δ2>0.15×A. Therefore, the above disadvantage can be prevented. It is more preferable that the maximum value of δ2 be set in such a manner that tilt of the outer roller 10 with respect to the axial line of the track groove 12 is 3° or less. In this case, it is possible to suppress rolling resistance of the outer roller 10.

As described above, by setting the track gap δ1 to satisfy δ1>0.03/A and setting the shoulder gap δ2 to satisfy δ2>0.15×A, and more preferably setting the maximum value of δ2 in such a manner that the tilt of the outer roller 10 in FIG. 5 is 3° or less with respect to the axial line of the track groove 12, it is possible to suppress both the contact between the outer circumferential surface 10a of the outer roller 10 on the no-load applied side and the roller guiding surface 12a and the contact between the side surface 10c of the outer roller 10 and the guide shoulder surface 12b to be minimum. Also, the frictional force generated between the respective contact surfaces can be suppressed. Therefore, the 3rd order cyclic axial force can be reduced, thus suppressing generation of shudder.

In this case, it is preferable to set the degree of torus A to satisfy 0.475≦A<1. When the degree of torus A is equal to or larger than one, it is not possible to generate the couple of restoring forces Mre having the magnitude that is enough to bring back the outer roller 10 to be parallel to the central axis of the outer joint member 4. On the other hand, when the degree of torus A is less than 0.475, the couple of restoring forces Mre generated on the outer roller 10 becomes larger. However, since the track gap δ1 becomes excessively large, looseness in the circumferential direction between the track groove 12 and the outer roller 10 becomes large. This may have adverse effects such as generation of bumping sound. Therefore, it is preferable that total looseness in the circumferential direction considering a constant velocity universal joint on the outboard side be kept as small as possible.

In the above embodiment, a case has been described in which the roller guiding surface 12a and the outer circumferential surface 10a of the outer roller 10 have approximately the same radius of curvature of the generatrix and those surfaces 12a and 10a are brought in close contact with each other on the side to which a load is applied. However, the present invention is not limited thereto. For example, as shown in FIG. 6, the roller guiding surface 22a may have a Gothic arch shape. In this case, as shown in FIG. 6, while the operating angle is zero and a torque is applied, the minimum value of the gap between the roller guiding surface 22a on the no-load applied side and the outer circumferential surface 20a of the outer roller 20 in the horizontal direction in FIG. 6 corresponds to a track gap δ3 (mm). Thus, this track gap δ3 is determined to satisfy δ3>0.03/A. Similarly, a shoulder gap δ4 (mm) between the guide shoulder surface 22b formed at the bottom of the track groove 22 and the side surface 20c of the outer roller 20 is determined to satisfy δ4>0.15×A.

What is claimed is:

1. A tripod type constant velocity universal joint comprising:
   an outer joint member having track grooves extending axially and distributed at circumferentially trisectional positions on an inner circumferential surface of the outer joint member;
   an inner joint member having trunnion journals projecting radially and distributed at three equally spaced circumferential positions on an outer circumferential surface of the inner joint member; and
   roller mechanisms attached to the trunnion journals, respectively,
   each of the roller mechanism having a roller capable of being shaken with respect to a corresponding one of the trunnion journals and axially rolling on a corresponding one of the track grooves,
   each of the track grooves having roller guiding surfaces for guiding an outer circumferential surface of the roller of the corresponding roller mechanism on both circumferential sides, wherein
   a track gap δ1 (mm), formed between the outer circumferential surface of the roller and the corresponding roller guiding surface while a torque is applied, is set to satisfy δ1>0.03/A
   where the value A=r/R, and r represents a radius of curvature of a generatrix of the outer circumferential surface of the roller and R represents a radius of an outer circumference of the roller.

2. A tripod type constant velocity universal joint as claimed in claim 1, wherein
   the value A is set to satisfy 0.475≦A<1.

3. A tripod type constant velocity universal joint as claimed in claim 1, wherein
   the radius of curvature of the generatrix of the outer circumferential surface of the roller and a radius of curvature of the roller guiding surface are set to be approximately the same.

4. A tripod type constant velocity universal joint as claimed in claim 1, wherein
   the outer circumferential surface of the roller comes into angular contact with the roller guiding surface.

5. A tripod type constant velocity universal joint as claimed in claim 1, wherein
   in addition to the roller, the roller mechanism has a ring arranged inside the roller and rolling elements interposed between the ring and the roller.

6. A tripod type constant velocity universal joint comprising:
   an outer joint member having track grooves extending axially and distributed at circumferentially trisectional positions on an inner circumferential surface of the outer joint member;
   an inner joint member having trunnion journals projecting radially and distributed at circumferentially trisectional positions on an outer circumferential surface of the inner joint member; and
   roller mechanisms attached to the trunnion journals, respectively,
   each of the roller mechanism having a roller capable of being shaken with respect to a corresponding one of the trunnion journals and rolling axially on a corresponding one of the track grooves,
   each of the track grooves having a guide shoulder surface opposed to a side surface of the corresponding roller, wherein
   a shoulder gap δ2 (mm) between the guide shoulder surface and the side surface of the corresponding roller is set to satisfy δ2>0.15×A
   where the value A=r/R, and r represents a radius of curvature of a generatrix of an outer circumferential surface of the roller and R represents a radius of an outer circumference of the roller.

7. A tripod type constant velocity universal joint as claimed in claim 6, wherein
   the value A is set to satisfy 0.475≦A<1.

8. A tripod type constant velocity universal joint as claimed in claim 6, wherein the radius of curvature of the generatrix of the outer circumferential surface of the roller and a radius of curvature of the roller guiding surface are set to be approximately the same.

9. A tripod type constant velocity universal joint as claimed in claim 6, wherein the outer circumferential surface of the roller comes into angular contact with the roller guiding surface.

10. A tripod type constant velocity universal joint as claimed in claim 6, wherein in addition to the roller, the roller mechanism has a ring arranged inside the roller and rolling elements interposed between the ring and the roller.

11. A tripod type constant velocity universal joint comprising:

an outer joint member having track grooves extending axially and distributed at circumferentially trisectional portions on an inner circumferential surface of the outer joint member;

an inner joint member having trunnion journals projecting radially and distributed at circumferentially trisectional positions on an outer circumferential surface of the inner joint member; and roller mechanisms attached to the trunnion journals, respectively, each of the roller mechanisms having a roller capable of being shaken with respect to a corresponding one of the trunnion journals and rolling on a corresponding one of the track grooves axially, each of the track grooves having roller guiding surfaces for guiding an outer circumferential surface of the roller of the corresponding roller mechanisms on both circumferential sides and a guide shoulder surface opposed to a side surface of the corresponding roller, wherein a track gap $\delta 1$ (mm), formed between the roller guiding surface and the outer circumferential surface of the corresponding roller while a torque is applied, is set to satisfy $\delta 1 > 0.03/A$, and a shoulder gap $\delta 2$ (mm) between the guide shoulder surface and the side surface of the corresponding roller is set to satisfy $\delta 2 > 0.15 \times A$ where the value $A = r/R$, and r represents a radius of curvature of a generatrix of an outer circumferential surface of the roller and R represents a radius of an outer circumference of the roller.

12. A tripod type constant velocity universal joint as claimed in claim 11, wherein the value A is set to satisfy $0.475 \leq A < 1$.

13. A tripod type constant velocity universal joint as claimed in claim 11, wherein the radius of curvature of the generatrix of the outer circumferential surface of the roller and a radius of curvature of the roller guiding surface are set to be approximately the same.

14. A tripod type constant velocity universal joint as claimed in claim 11, wherein the outer circumferential surface of the roller comes into angular contact with the roller guiding surface.

15. A tripod type constant velocity universal joint as claimed in claim 11, wherein in addition to the roller, the roller mechanism has a ring arranged inside the roller and rolling elements interposed between the ring and the roller.

* * * * *